United States Statutory Invention Registration [19]

[11] Reg. Number: H87

Reynolds [45] Published: Jul. 1, 1986

[54] ONE PIECE EJECTOR/EJECTOR SPRING FOR CARTRIDGE FIRING WEAPONS

[75] Inventor: George L. Reynolds, Altona, Ill.

[73] Assignee: The United States of America as represented by the Secretary of the Army, Washington, D.C.

[21] Appl. No.: 754,548

[22] Filed: Jul. 15, 1985

Related U.S. Application Data

[63] Continuation of Ser. No. 514,430, Jul. 18, 1983, abandoned.

[51] Int. Cl.[4] ..... F41C 15/00
[52] U.S. Cl. ..... 42/25
[58] Field of Search ..... 42/1 F, 25

[56] References Cited

U.S. PATENT DOCUMENTS

| | | | |
|---|---|---|---|
| 400,679 | 4/1889 | Hepburn | 42/25 |
| 659,928 | 10/1900 | Johnson | 42/25 |
| 1,041,410 | 10/1912 | Benét et al. | 42/25 |
| 1,169,248 | 1/1916 | Frommes | 42/25 |
| 1,363,613 | 12/1920 | Payne | 42/25 |
| 2,780,881 | 2/1957 | Crittendon et al. | 42/25 |
| 4,269,108 | 5/1981 | Stoner | 42/25 |

OTHER PUBLICATIONS

Brett, "BSA MKI Ejection", *The American Rifleman,* October 1975, p. 34.

Wallack, *American Pistol & Revolver Design and Performance,* Winchester Press, Tulsa, Oklahoma, 1978, pp. 58–59.

*Primary Examiner*—Deborah L. Kyle
*Assistant Examiner*—Ted L. Parr
*Attorney, Agent, or Firm*—Anthony T. Lane; Robert P. Gibson; Harold Card

[57] ABSTRACT

A combined one piece cartridge case ejector and ejection spring useful in guns which have non-locking bolts for which conventional coil spring ejectors are not feasible. The device comprises a solid piece of elastic material such as hard rubber or nylon which is arranged in the path of the rearward travel of the spent cartridge case following firing and diametrically opposite from the extractor. This structure provides positive ejection of spent cartridge cases without damage thereto. The invention is of particular utility with cartridge cases with centers of gravity far to the rear thereof, which require high torque for positive ejection.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ONE PIECE EJECTOR/EJECTOR SPRING FOR CARTRIDGE FIRING WEAPONS

GOVERNMENTAL INTEREST

The invention described herein was made under a contract with the Government, number DAAK10-78-C-0415 awarded by the Department of the Army; the Government has rights in the invention pursuant thereto.

This application is a continuation, of application Ser. No. 514,430, filed July 18, 1983 abandoned.

BACKGROUND OF THE INVENTION

This invention relates to firearms, and more particularly to firearms of the cartridge firing type in which the center of gravity of the empty or spent cartridge case is relatively close to the rear thereof. Such cartridge cases are difficult to eject from the weapon after the firing thereof by conventional means such as rigid fixed ejectors or spring loaded ejectors. The cartridge case of the 30 mm Semiautomatic Grenade launcher recently developed by the Department of the Army utilizes a cartridge case with a center of gravity far to the rear thereof as well as a non-locking bolt. The use of conventional ejectors of the types described was not feasible with this grenade launcher because a conventional spring loaded ejector in which a helical ejector spring is carried within a hollow bolt would tend to push the bolt out of battery before firing because of the non-locking bolt feature. Further, a conventional fixed ejector, for example a metal pin mounted in the weapon's receiver in the path of the rearward motion of the case following firing, can impart a high rotational velocity to the case to effect reliable ejection; however such rigid metallic ejectors often deform the cartridge cases. This deformation reduces the kinetic energy imparted to the case and thus makes ejection less reliable, and also damages the cases which otherwise may be reused.

SUMMARY OF THE INVENTION

In the case of the aforementioned grenade launcher and in accordance with the invention, this problem is solved by employing a simple one-piece plastic ejector which resembles and is installed like the fixed metallic ejectors mentioned above, but which is made of elastically compressible material, unlike the prior art metallic ejectors.

The ejector/ejector spring thus may comprise merely a cylindrical or square piece of elastic plastic such as nylon, mounted in the weapon's receiver in the path of the rearward travel of the cartridge case after firing and diametrically opposite to the position of the extractor. Just before the limit of the rearward travel of the bolt, extractor and cartridge case is reached, the cartridge case base strikes the ejector and compresses it. This imparts a torque to the spent cartridge case tending to rotate it around the claw of the extractor and thus out of the ejection port adjacent thereto. Before the bolt and the other parts attached thereto reach the limit of their rearward travel, the ejector/ejector spring expands to apply additional torque to the cartridge case, thus insuring reliable ejection thereof with minimum possibility of damage to the case.

It is thus an object of the invention to provide a cartridge firing weapon with a fixed ejector which also functions as an ejector spring and which can reliably eject cartridge cases from weapons even if the center of gravity of such case is far to the rear thereof, and without deforming the case.

Another object of the invention is to provide a novel and effective cartridge case ejector mechanism for a weapon which employs a non-locking bolt and which utilizes a cartridge case with a center of gravity located near the base thereof.

A further object is to provide a cartridge case ejector which has the advantages of a rigid fixed ejector as well as the advantages of a coiled spring type of ejector.

A still further object of the invention is to provide a fixed elastic cartridge case ejector which will, due to its elasticity, impart a high torque to a spent cartridge case to provide reliable ejection thereof without damage thereto.

These and other features and advantages of the invention will become apparent from the following detailed description and the drawings.

DETAILED DESCRIPTION OF A PREFERRED EMBODIMENT

Figure 1:
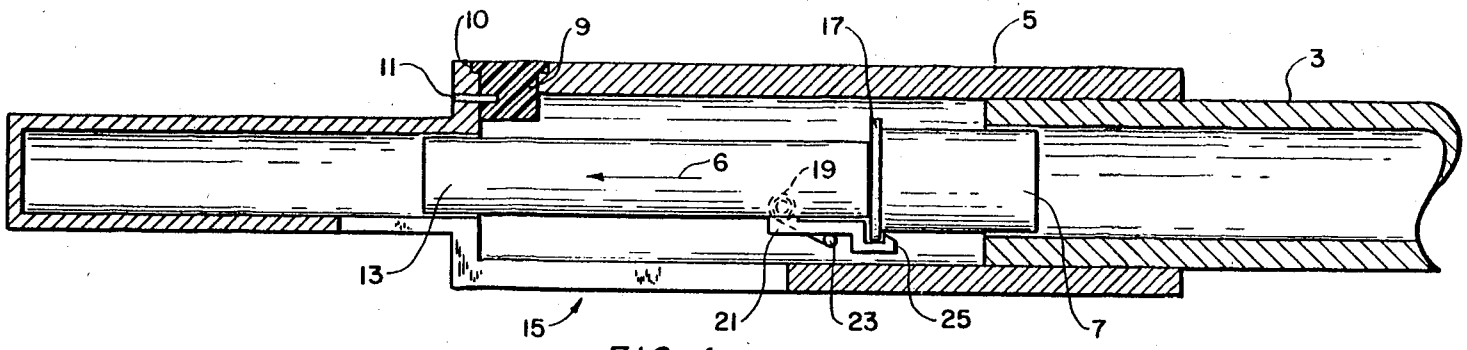
FIG. 1 shows a vertical cross section of a portion of a weapon including the present invention as it appears just after the firing thereof.

In FIG. 1 the weapon's barrel 3 and the receiver 5 thereof are shown in vertical cross section, showing the bolt 13 with the spent cartridge case 7 moving aft as indicated by the arrow 6, just after firing. The extractor 21 is attached to the bolt 13 by means of a pin 19 around which the extractor can rotate for example to permit the claw 25 at its forward end to snap around the forward end of flanged base 17 of the cartridge case 7 during the loading operation. After firing, the extractor pulls the cartridge case to the rear so that it can be ejected through ejection port 15. The extractor is held in engagement with the cartridge case flange 17 by means of a spring 23 which urges the extractor against the underside of bolt 13. The spring 23 may be wound around the pin 19 with its tail under the extractor to urge the extractor in the counterclockwise direction as viewed in FIGS. 1 and 2. This invention is applicable to guns with other types of extractors, for example extractors which are rigidly attached to the bolt or integral therewith, or are attached thereto by means other than a pin.

Figure 2:
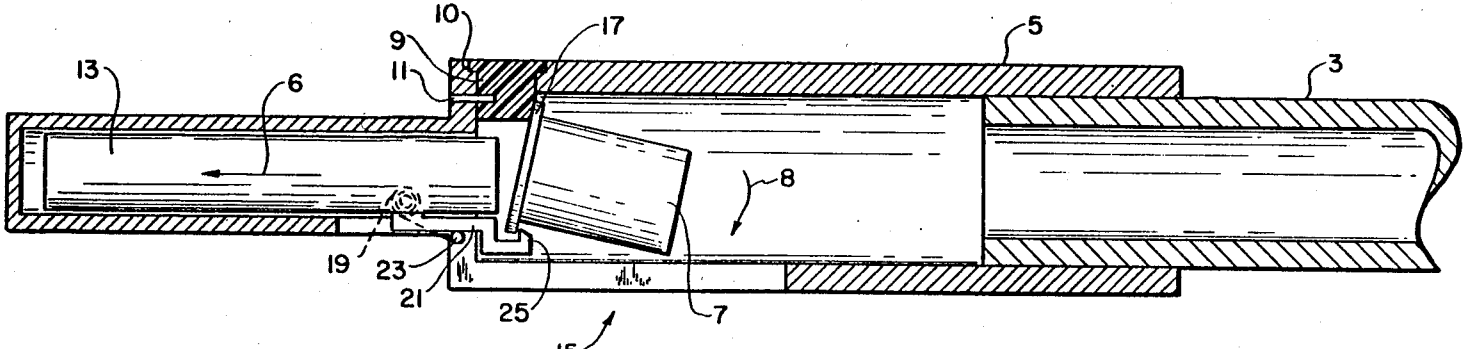
FIG. 2 is a similar view of the weapon of FIG. 1 just before the bolt thereof reaches the limit of its rearward travel.

The combined ejector/ejector spring 9 comprises a solid piece of plastic or other solid material of suitable elasticity, mounted in a bore in the receiver 5, as shown, so that it projects into the path of the flange 17 of the cartridge case near the rearward limit of its travel. The ejector/ejector spring is located diametrically opposite from the extractor 21. FIG. 2 shows the bolt and cartridge just before the limit of the rearward bolt travel has been reached. The upper part of the cartridge flange 17 has struck the ejector/ejector spring and compressed it. This imparts a torque, indicated by arrow 8, to the cartridge case which tends to rotate it around the extractor claw 25 and hence out through the ejection port 15. A moment later, when the bolt and extractor are still moving aft, the plastic piece 9 will start to expand towards its relaxed position as shown in FIG. 1. The combination of this forward motion of the ejector/ejector spring 9, which is now functioning as a stiff ejector spring, with the rearward motion of the extractor provides the large torque necessary to positively eject cartridge cases of the type described. Positive ejection of such cases requires that the lightweight forward portion thereof be accelerated to high rotational velocity to provide the required inertia to carry the heavier rear portion out of the receiver.

The ejector/ejector spring 9 may be cylindrical with the axis thereof vertical as viewed in FIGS. 1 and 2 with an enlarged portion or flange 10 at the top thereof. The pin 11 is inserted in a hole in the receiver wall and through the elastic piece 9 to retain it in place. The elastic piece 9 can be made of a hard natural or synthetic elastomer, e.g. rubber, or plastic, for example, nylon, and can have other shapes, for example it can be a square block rather than a cylinder, or it can be a cylinder with its axis horizontal so that the cartridge flange strikes the flat base of the cylinder.

The elasticity of this ejector prevents deformation and damage to the cartridge case which could result from the use of a rigid metallic ejector, and further the elastic ejector acts like a stiff coiled spring, as explained above, but does not have the disadvantages thereof. The use of a coiled ejector spring would require additional parts with consequent higher assembly and maintenance costs, and is impractical for a weapon with a non-locking bolt.

While the invention has been described in connection with an illustrative embodiment, obvious variations therein are possible without departing from the spirit of the invention. Accordingly, the invention should be limited only by the scope of the appended claims.

I claim:

1. A semi-automatic grenade launcher for firing a cartridge having a case provided with a rim, said launcher including a receiver provided with a reciprocal non-locking bolt and a port, an extractor mounted on said bolt for engagement with said rim after firing said case, and a solid elongate piece of elastic nylon secured to said receiver opposite said port, having an axis perpendicular to said reciprocating bolt for striking engagement with said rim of said cartridge, for ejection through said port.

2. The grenade launcher as in claim 1 wherein said nylon material is cylindrical in shape having a surface for striking engagement with said rim of said cartridge case for ejection through said port.

3. The grenade launcher as in claim 1 wherein said nylon material is rectangular in shape having a flat surface for striking engagement with said rim of said cartridge case for ejection through said port.

* * * * *